Patented Feb. 5, 1924.

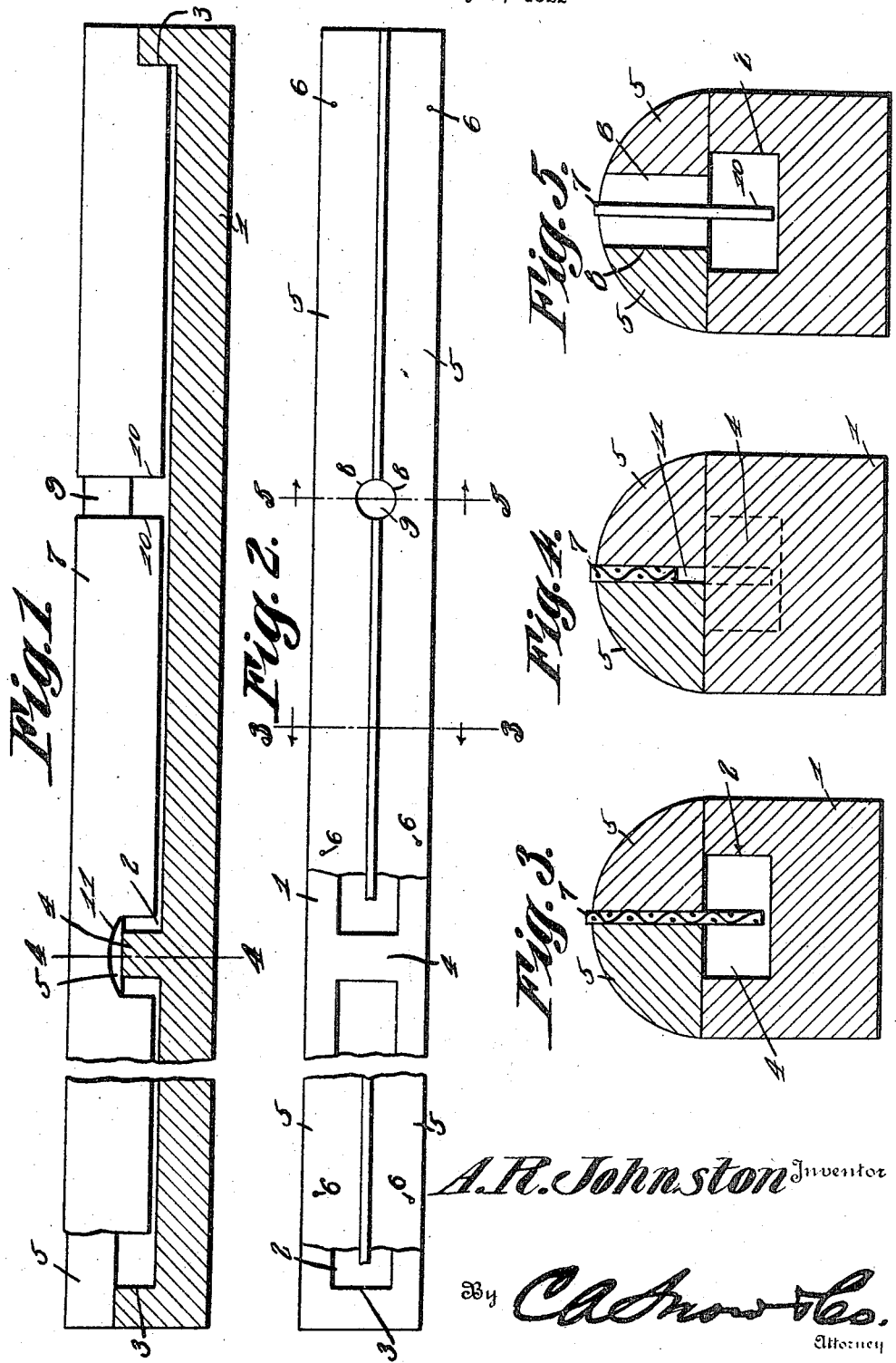

1,482,436

UNITED STATES PATENT OFFICE.

ALVIN R. JOHNSTON, OF NAPOLEON, OHIO.

POULTRY PERCH.

Application filed July 3, 1922. Serial No. 572,642.

*To all whom it may concern:*

Be it known that I, ALVIN R. JOHNSTON, a citizen of the United States, residing at Napoleon, in the county of Henry and State of Ohio, have invented a new and useful Poultry Perch, of which the following is a specification.

The device forming the subject matter of this application is a poultry perch, and the invention aims to provide novel means whereby a liquid insecticide may pass from one end of the perch to the other.

Another object of the invention is to provide novel means whereby the liquid insecticide in the perch may be transferred to the feet of fowls roosting on the perch.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts being broken away; Figure 2 is a top plan wherein parts are broken away; Figure 3 is a cross section on the line 3—3 of Figure 2; Figure 4 is a cross section on the line 4—4 of Figure 1; Figure 5 is a cross section on the line 5—5 of Figure 2.

The device forming the subject matter of this application preferably is made of wood and comprises a base 1, in the form of a bar, provided in its upper edge with a longitudinal groove 2 which is terminated short of the ends of the base, as shown at 3. At points spaced apart longitudinally of the base 1, the base is supplied with partitions 4 extending across the groove 2. Top strips 5, which may be quarter rounds, are mounted on the base 1 and are connected thereto by securing elements 6, such as brads. An absorbent wick 7 is bound between the top strips 5 and extends downwardly into the groove 2. The top strips 5 may be supplied with cooperating notches 8 forming a filling opening 9 for the groove 2. The wick 7 may be interrupted at the filling opening 9 as shown at 10. The wick 7 is cut away as indicated at 11 above the partitions 4.

In particular operation, the insecticide is poured into the groove 2 through the opening 9 and flows from one end of the perch to the other, the perch preferably being inclined slightly with respect to the horizontal, so that the insecticide can find its way on the perch from end to end. Owing to the fact that the partitions 4 are provided, the insecticide will be prevented from accumulating entirely at one end of the perch and will be distributed throughout the length of the perch. Since the wick 7 is cut away as indicated at 11, above the partition 4, the insecticide can flow along from one end of the perch to the other when the insecticide is poured into the groove 2 through the opening 9.

What is claimed is:—

A perch comprising a base having a longitudinal groove, the base being supplied with a partition extended across the groove, top strips, means for securing the top strips to the base, and a wick located between the top strips and extended downwardly into the groove, the wick extending across the partition, and being cut away in its lower edge about the partition, thereby permitting the wick to extend downwardly into the groove on both sides of the partition.

In testimony that I claim the foregoing as my own, I have hereto affixed my signature in the presence of two witnesses.

ALVIN R. JOHNSTON.

Witnesses:
   J. F. VANDENBROCK,
   FRANCES SPENCER.